United States Patent [19]

Suzuki

[11] 4,157,045
[45] Jun. 5, 1979

[54] LUBRICATING SYSTEM FOR AN OIL SEAL IN A DIFFERENTIAL GEAR

[75] Inventor: Takaaki Suzuki, Obara, Japan

[73] Assignee: Toyota Jidosha Kogyo Kabushiki Kaisha, Aichi, Japan

[21] Appl. No.: 820,898

[22] Filed: Aug. 1, 1977

[30] Foreign Application Priority Data

Aug. 3, 1976 [JP] Japan .................. 51-103619[U]

[51] Int. Cl.² .............................................. F16H 1/44
[52] U.S. Cl. ....................... 74/713; 74/467; 184/6.12
[58] Field of Search ............... 184/6.12, 11 R, 11 B, 184/13 R; 74/695, 710, 713, 467

[56] References Cited

U.S. PATENT DOCUMENTS

| 2,618,359 | 11/1952 | Alden | 184/11 R |
|---|---|---|---|
| 2,793,714 | 5/1957 | Luenberger | 184/6.12 X |
| 3,182,527 | 5/1965 | Bryan | 184/11 R X |
| 3,214,989 | 11/1965 | Wellauer et al. | 184/6.12 X |
| 3,260,132 | 7/1966 | West et al. | 74/710 X |
| 3,508,630 | 4/1970 | Keller et al. | 184/11 R |
| 3,590,954 | 7/1971 | Plantan | 74/710 X |

Primary Examiner—David H. Brown
Attorney, Agent, or Firm—Stevens, Davis, Miller & Mosher

[57] ABSTRACT

A lubricating system for an oil seal in a differential gear comprising a differential carrier having a pair of bosses, a pair of spacers, a pair of differential cases and a ring gear therein and a pair of side shafts penetrating both sides of the differential carrier. The oil seal is inserted between each of the side shafts and the differential carrier to prevent leakage of lubricating oil therefrom. In the system of the present invention, there is provided an opening which communicates with a space defined by the side shaft and each of the bosses, spacers and differential cases between the oil seal and the ring gear.

2 Claims, 4 Drawing Figures

LUBRICATING SYSTEM FOR AN OIL SEAL IN A DIFFERENTIAL GEAR

The present invention relates to a lubricating system for an oil seal in a differential gear used in a power transmission system, such as one on an automobile. More particularly, the invention relates to a lubricating system for an oil seal provided between each side shaft and the differential carrier to prevent leakage of oil from where the side shaft penetrates the differential carrier.

In a conventional differential gear of an automobile comprising a differential gear and a pair of drive shafts penetrating both sides thereof, an oil seal is generally provided in a portion where each drive shaft penetrates the differential carrier to prevent leakage of lubricating oil therefrom.

In the differential gear of the above construction, a drive pinion shaft having a drive pinion can be mounted to a lower portion of the differential carrier since the drive pinion and a ring gear engaging therewith are hypoid gears. Thus, the oil seal provided in the portion where the drive shaft penetrates the differential gear is constantly lubricated since the oil level in the differential carrier is kept about in the center line of the drive pinion shaft and lubricating oil splashed by rotation of the ring gear is fed to the oil seal via the bearing of the drive pinion shaft.

In case of said side shaft, however, the oil seal between the side shaft and the differential carrier is positioned so high above the oil level that it is not sufficiently lubricated by oil since the side shaft cannot be mounted to the lower portion of the differential carrier. Further, lubricating oil splashed by rotation of the ring gear is prevented from reaching the lip of the oil seal by a spacer, a bearing and a bearing case provided in the differential gear. Thus, the oil seal between the side shaft and the differential carrier is not lubricated when the automobile is ordinarily driven unless lubricating oil moves to one side of the differential carrier by cornering of the automobile. Consequently, the lip of the oil seal contacting the side shaft tends to wear, get rough or seize. This leads to lowering of sealing effect of the oil seal which causes lack of durability and occurrence of a frictional sound.

An object of the present invention is to provide a lubricating system for an oil seal in a differential gear which can constantly lubricate the oil seal by feeding oil splashed by rotation of the ring gear to the oil seal and prevent wearing, roughening and seizure of the sealing surface due to a shortage of oil.

Another object of the present invention is to provide an lubricating system for an oil seal in a differential gear capable of improving durability of the oil seal by raising the sealing effect of the oil seal.

Still another object of the present invention is to provide a lubricating system for an oil seal of a differential gear which can prevent the occurrence of a frictional sound.

The invention will now be described in further detail by way of example with reference to the accompanying drawings, in which.

Figure 1:
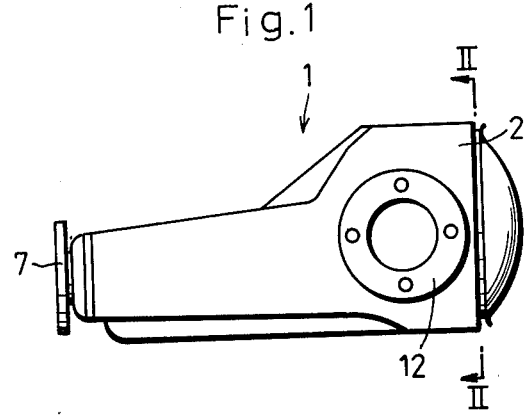
FIG. 1 is a side elevational view of a differential gear in which the system of the present invention is applied.
Figure 2:
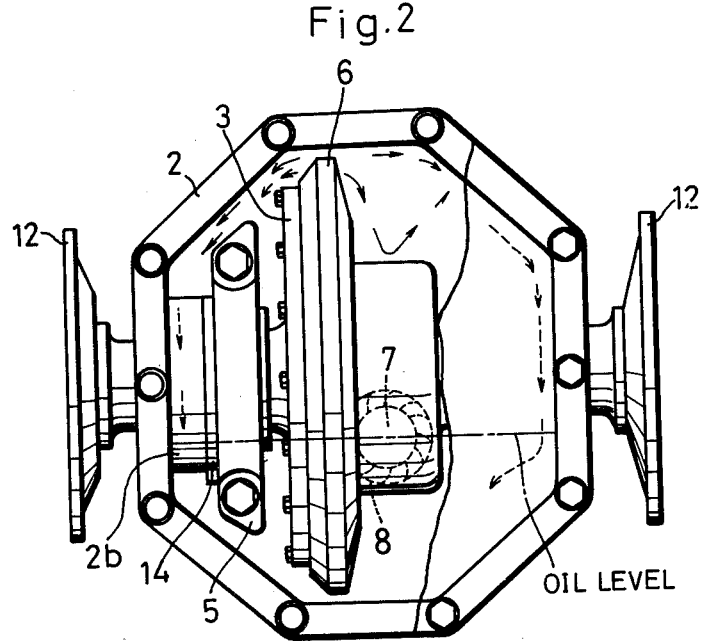
FIG. 2 is a partially fragmentary front view shown in the direction of the arrows indicated by II in FIG. 1.
Figure 3:
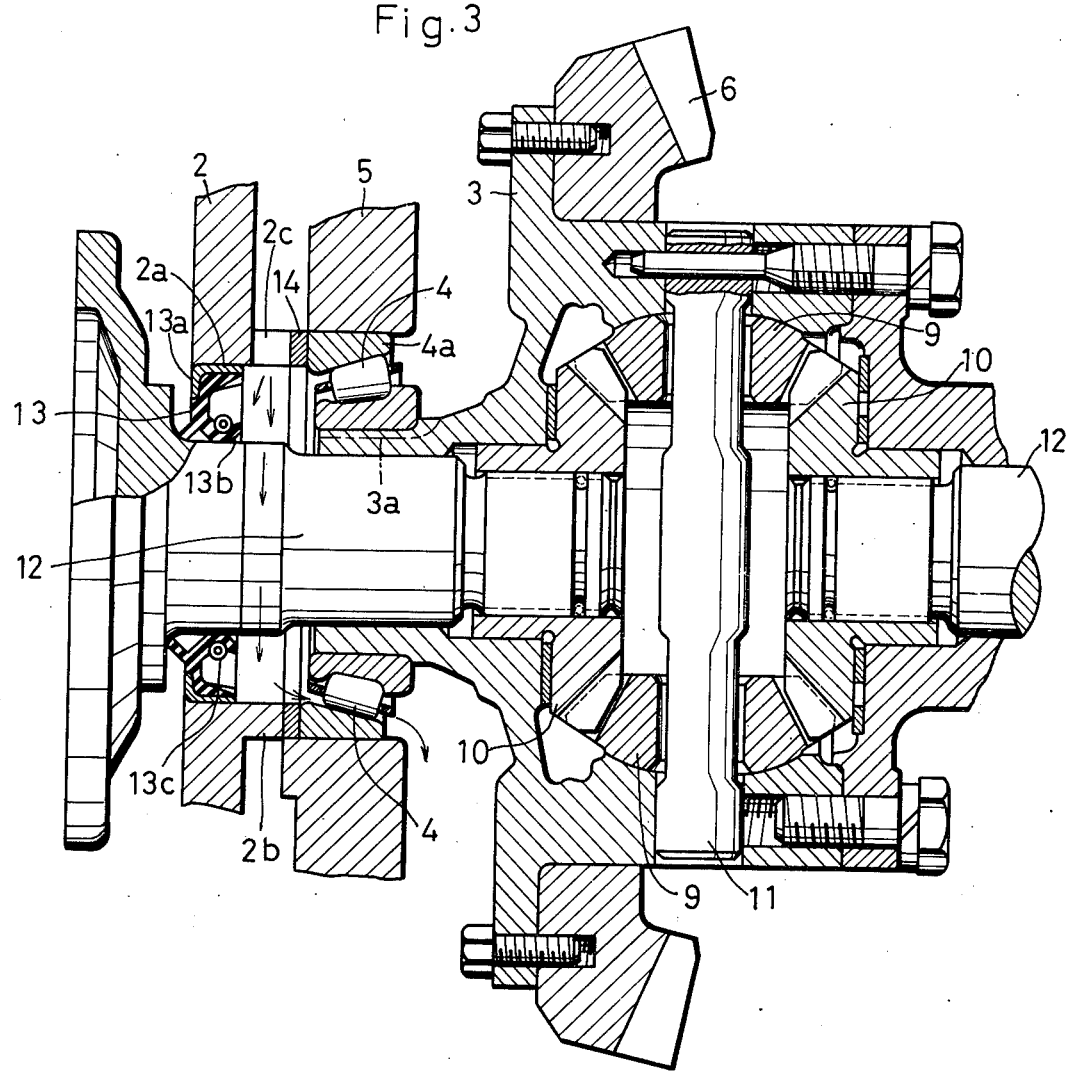
FIG. 3 is an enlarged cross sectional view of the lefthand side of FIG. 2.

Referring now to FIGS. 1 to 3 of the drawings, there is shown a conventional differential gear 1 comprising a differential carrier 2. Numeral 3 shows a differential case which is assembled with the differential carrier 2 by a bearing case 5 via a tapered roller bearing 4. A ring gear 6 is mounted to the differential case 3 to engage with a drive pinion 8 of a drive pinion shaft 7 which rotates by torque transmitted from a propeller shaft (not shown). In the differential case 3, there are provided a pair of pinion gears 9 and right and left side gears 10 which engage with said pinion gears 9. The pinion gears 9 are mounted to the differential case 3 by a pinion shaft 11, and the side gears 9 are respectively connected to side shafts 12 by spline engagement.

Attention is now drawn to the left-hand side of FIG. 3 in which one of the side shafts 12 is shown penetrating the side wall of the differential carrier 2. The differential gear 1 contains lubricating oil for lubricating gears and bearings provided therein, generally to the level of the center line of the drive pinion shaft 7 (see FIG. 2). When an automobile is driven, lubricating oil in the differential gear 1 is splashed by rotation of the ring gear 6, and in case of cornering, lubricating oil moves against one of the side shafts 12. An oil seal 13 is provided between the side shaft 12 and the differential carrier 2 to prevent leakage of oil therefrom. The oil seal 13 comprises an outer cylinder 13a of metal which closely contacts the surface of a bore 2a of the differential carrier 2 and a lip 13b of synthetic rubber which is pressed against the outer periphery of the side shaft 12 by a spring 13c to seal the side shaft 12. The differential carrier 2 has a boss 2b which is provided inside (the right-hand side in FIG. 3) of the bore 2a receiving the oil seal 13 to press the side face of the outer race 4a of the tapered roller bearing 4 via a spacer 14. Namely, the portion between the oil seal 13 and the tapered roller bearing 4 is completely sealed by the boss 2b of the differential carrier 2 and the spacer 14. Thus, lubricating oil splashed by rotation of the ring gear 6 in the differential carrier 2 in the directions indicated by arrows in FIG. 2 is prevented by the tapered roller bearing 4, the spacer 14 and the boss 2b from reaching the oil seal 13.

In the system of the present invention, an opening 2c is provided in the upper portion of the boss 2b as shown in FIG. 3. Therefore, lubricating oil splashed by rotation of the ring gear 6 flows down through the opening 2c to lubricate the upper portion of the side shaft 12 and the oil seal 13, and is thereafter discharged through the lower portion of the tapered roller bearing 4 as indicated by arrows in FIG. 3.

In the embodiment of the present invention, there may be provided a recess 3a or a spiral groove (not shown) in the upper portion of the differential case 3 as shown by a chain line in FIG. 3 in place of the opening 2c in the upper portion of the boss 2b. Further, a recess 14a can be provided in the upper portion of the spacer 14 as shown in FIG. 4.

Figure 4:
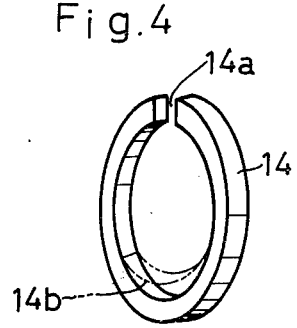
FIG. 4 is a perspective view of a spacer provided in the system of the present invention.

In case the recess 14a is provided in the spacer 14, a weir 14b is preferably provided in the lower portion of the spacer 14 as shown by a chain line in FIG. 4 to facilitate lubrication of the oil seal 13 by collecting oil between the weir 14b and the lower portion of the oil seal 13.

While the invention has been described with reference to a preferred embodiment thereof, it is to be understood that modifications or variations may be easily made without departing from the scope of this invention which is defined by the appended claims.

What is claimed is:

1. A lubricating system for an oil seal means in a differential gear comprising a differential carrier having a pair of bosses, a pair of spacers, a differential case and a ring gear therein and a pair of side shafts penetrating both sides of said differential carrier, said oil seal means comprising an oil seal between each of said side shafts and said differential carrier in an oil-tight manner, a recess in the upper portion of each of said spacers to facilitate the inflow of lubricating oil into a space defined by each of said side shafts, said bosses, said spacers and said differential case, and each of said spacers comprises a weir for collecting oil flowing from said recess into the interior of the corresponding boss between each of said weirs and said oil seals.

2. A differential gear comprising:
a differential carrier having a substantially vertically extending side with a first substantially horizontally extending opening therethrough and a substantially horizontally extending boss extending inwardly from said side and defining part of said opening;
a differential case having a second substantially horizontally extending opening therethrough;
a roller bearing on said case;
a ring gear on said case;
a substantially vertically disposed annular ring-shaped spacer in contact with and between said boss and the roller bearing;
a side shaft extending through said openings and said spacer;
an annular oil seal surrounding said shaft and fluid-tightly positioned in the first opening between the differential carrier and the shaft;
a radially extending oil passage, defined through the upper portion of said spacer, through which lubricating oil may flow from above into a space defined by said side shaft, said boss, said spacer and said differential case; and
said spacer further comprises a radially inwardly extending weir at the lower end thereof for collecting oil between the weir and the lower portion of the oil seal.

* * * * *